United States Patent
Schiff et al.

(10) Patent No.: US 8,570,007 B2
(45) Date of Patent: Oct. 29, 2013

(54) PHASE DOUBLING FOR SWITCHING POWER SUPPLY

(75) Inventors: Tod F. Schiff, Portland, OR (US); Jerry Z. Zhai, Toronto (CA); Kean Pan, Shanghai (CN)

(73) Assignee: Analog Devices, Inc., Norwood, MA (US)

( * ) Notice: Subject to any disclaimer, the term of this patent is extended or adjusted under 35 U.S.C. 154(b) by 1387 days.

(21) Appl. No.: 11/400,749

(22) Filed: Apr. 6, 2006

(65) Prior Publication Data

US 2009/0153120 A1    Jun. 18, 2009

Related U.S. Application Data

(60) Provisional application No. 60/714,657, filed on Sep. 6, 2005.

(51) Int. Cl.
  *G05F 1/40*      (2006.01)
  *H02M 1/00*      (2007.01)

(52) U.S. Cl.
  USPC ............................ 323/271; 323/282; 363/147

(58) Field of Classification Search
  USPC .......... 323/271, 272, 282–285, 351; 370/536, 370/542; 361/783; 363/147
  See application file for complete search history.

(56) References Cited

U.S. PATENT DOCUMENTS

| | | | |
|---|---|---|---|
| 6,363,505 B1 * | 3/2002 | Vest et al. ...................... | 714/726 |
| 6,628,106 B1 | 9/2003 | Batarseh et al. | |
| 6,683,441 B2 | 1/2004 | Schiff et al. | |
| 6,737,886 B2 | 5/2004 | Curatolo et al. | |
| 6,850,045 B2 * | 2/2005 | Muratov et al. ................ | 323/272 |
| 6,873,140 B2 * | 3/2005 | Saggini et al. ................ | 323/283 |
| 6,943,535 B1 | 9/2005 | Schiff | |
| 6,981,087 B1 * | 12/2005 | Heitkamp et al. ............. | 710/301 |
| 7,266,156 B2 * | 9/2007 | Montojo et al. .............. | 375/267 |
| 7,738,512 B2 * | 6/2010 | Shin .............................. | 370/536 |

OTHER PUBLICATIONS

Analog Devices, *6-Bit Programmable 2-/3-/4-Phase Synchronous Buck Controller ADP3188 (Rev. A)*, 2005, pp. 1-28.
J.A. Abu-Qahouq, N. Pongratananukul, I. Batareh and T. Kasparis, *Multiphase Voltage-Mode Hysteretic Controlled VRM with DSP Control and Novel Current Sharing*, 2002, pp. 633-669.

* cited by examiner

*Primary Examiner* — Jessica Han
(74) *Attorney, Agent, or Firm* — Marger Johnson & McCollom PC

(57) ABSTRACT

A switching power supply control system may include logic to generate a greater number of second switching control signals in response to a first number of original switching control signals. For example, the logic may increase the number of phases that may be controlled by an existing switching power supply controller. The logic may be configured to steer feedback signals from the increased number of phases back to original feedback inputs on the controller.

8 Claims, 6 Drawing Sheets

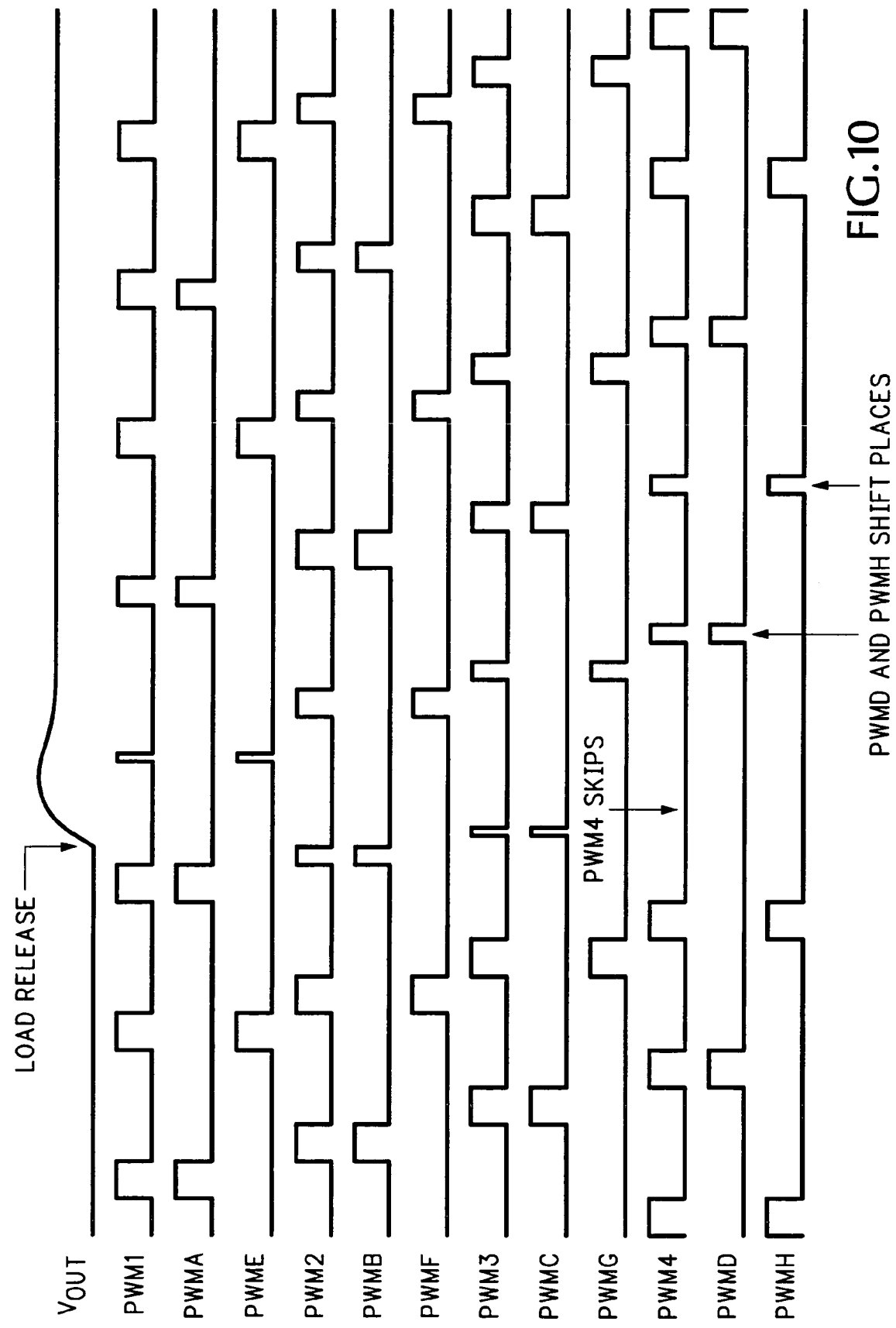

US 8,570,007 B2

PHASE DOUBLING FOR SWITCHING POWER SUPPLY

This application claims priority from U.S. Provisional Application Ser. No. 60/714,657 entitled Method For Doubling Phases In A Switching Power Supply, filed Sep. 6, 2005 which is incorporated by reference.

BACKGROUND

FIG. 1 illustrates a prior art switching power supply with output current sensing as disclosed in U.S. Pat. No. 6,683,441. The system of FIG. 1 includes a controller 20 that generates switching control signals SC1 and SC2 to drive switch circuits 10 and 12, thereby controlling the amount of power delivered to the load 22 through inductors 14 and 16. Additional circuitry would typically be included to sense the output voltage $V_{OUT}$ so the controller can modulate the switch signals to maintain a constant output voltage regardless of the amount of current consumed by the load. The sensed output voltage is usually combined with an input signal to generate an error signal that is applied to the controller for closed-loop control of the output. Additional components such as capacitors would typically also be added for filtering the output voltage.

The system of FIG. 1 also includes a current sensing circuit 18 to generate a signal $V_{CS}$ that provides a measure of the total combined output current delivered to the load. The current sense signal may be used in numerous ways. For example, it may be used to provide over-current shutdown, it may be used to implement current-mode regulation, or it may be combined with voltage feedback to establish a droop impedance for adaptive voltage positioning (AVP) control schemes.

The system of FIG. 1 is known as a multi-phase switching power supply because the power components including the switches and inductors are repeated to produce multiple output currents that are summed together to provide the total output current. This increases the amount of current available from the power supply, but also increases the complexity of the controller and sensing circuits.

BRIEF DESCRIPTION OF THE DRAWINGS

FIGS. 9 and 10 illustrate example waveforms for embodiment of FIG. 8.

DETAILED DESCRIPTION

Figure 2:
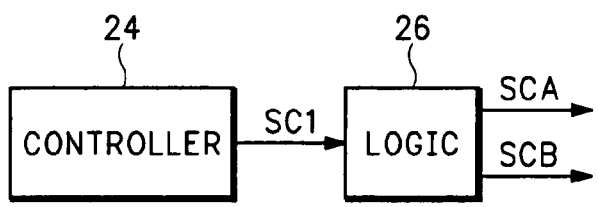
FIG. 2 illustrates an embodiment of a switching power supply control system according to the inventive principles of this patent disclosure.

FIG. 2 illustrates an embodiment of a switching power supply control system according to the inventive principles of this patent disclosure. The embodiment of FIG. 2 includes a controller 24 that may generate any number of first switching control signals SC1, SC2, etc., that are intended to control switches in a switching power supply. In this example, the number of first signals is one, but the inventive principles of this patent disclosure apply to a controller having any number of switching control signals. Logic 26 uses the first switching control signals to generate a greater number of second switching control signals SCA, SCB, etc. In this example, there are two second signals. Thus, the embodiment of FIG. 2 may allow a controller that is designed for a certain number of phases to control even more phases in a switching power supply.

The logic 26 may be configured to generate the second switching control signals SCA, SCB, etc. in any desired sequence. For example, second switching control signals may be divided into sets with a first set controlled in a first sequence and a second set controlled in a second sequence. If the first switching control signals SC1, SC2, etc. are controlled so that they are activated in a predetermined sequence, the same sequence may be used for the first and second sets of the second switching control signals SCA, SCB, etc. For instance, the first set of second signals may be activated in the predetermined sequence, followed by the second set being activated in the predetermined sequence. The logic may continue to alternate between activating first and second sets in the predetermined sequence or in any other desired sequence.

Figure 3:
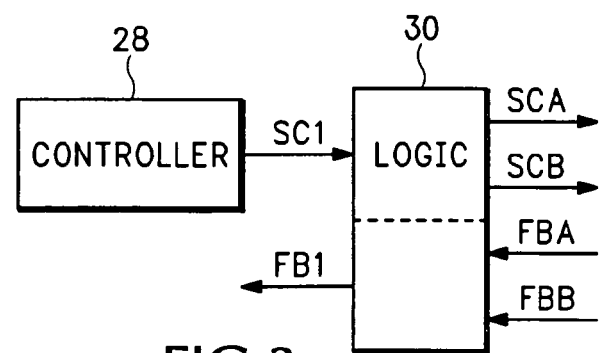
FIG. 3 illustrates another embodiment of a switching power supply control system according to the inventive principles of this patent disclosure.

FIG. 3 illustrates another embodiment of a switching power supply control system according to the inventive principles of this patent disclosure. The embodiment of FIG. 3 includes a controller 28 and logic 30 that operates in a similar manner to the embodiment of FIG. 2. The logic in the embodiment of FIG. 3, however, is configured to steer a number of second feedback signals FBA, FBB, etc. to a lesser number of first feedback signals FB1, FB2, etc. Steering may be accomplished through various techniques, for example, a multiplexer using discrete switches, resistive dividers connected to switching nodes, etc. In this example, the number of first feedback signals is one, and the number of second feedback signals is two but the inventive principles are not limited to any particular numbers. Each of the first feedback signals may be coordinated with a corresponding one of the first switching control signals. Likewise, each of the second feedback signals is coordinated with a corresponding one of the second switching control signals. The embodiment of FIG. 3 may, for example, allow a controller 28 that is designed for a certain number of phases to control even more phases in a switching power supply without affecting the feedback control loop of the system.

Figure 4:
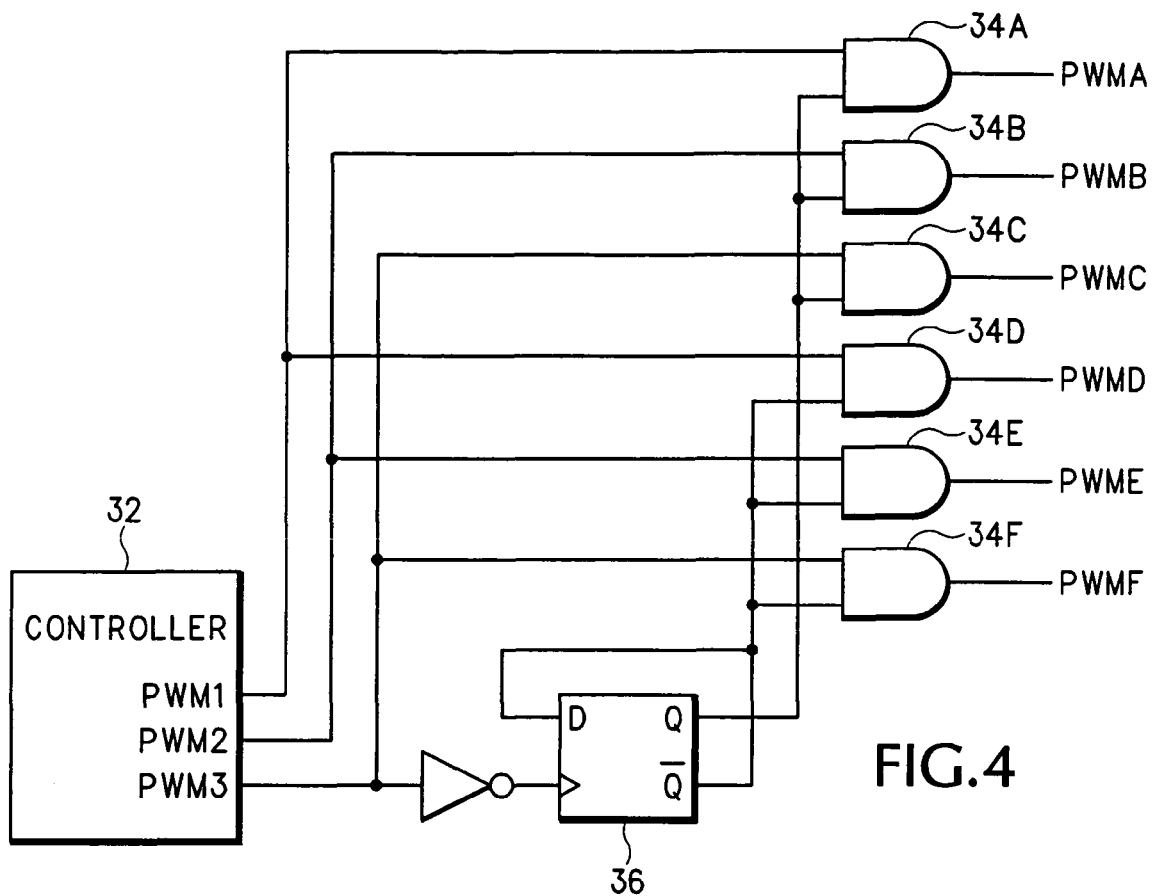
FIG. 4 illustrates an example embodiment of a switching power supply control system according to the inventive principles of this patent disclosure.

FIG. 4 illustrates an example embodiment of a switching power supply control system that illustrates how the inventive principles of this patent disclosure may be applied to double the number of phases that may be controlled by an existing switching power supply controller. The controller 32 illustrated in FIG. 4 may be, for example, a three-phase controller that implements a pulse width modulation (PWM) control scheme by driving three switches (or pairs of switches) with switching control signals PWM1, PWM2 and PWM3. A logic circuit includes six AND gates 34A-34F that demultiplex the original set of three control signals PWM1-PWM3 into six control signals PWMA-PWMF. A D-type flip-flop 36 is clocked by PWM3 to enable a first set of three of the gates 34A-C while a second set 34D-F is disabled during a complete sequence of PWM1-3. The flip-flop then disables the first set while the second set is enabled during another complete sequence of PWM1-3. Thus, the logic alternates between activating PWMA-C and PWMD-F in the same sequence as the original three switching control signals PWM1-3. The six switching control signals PWMA-F may be used to drive six switches (or pairs of switches) to implement a six-phase switching power supply.

Figure 1:
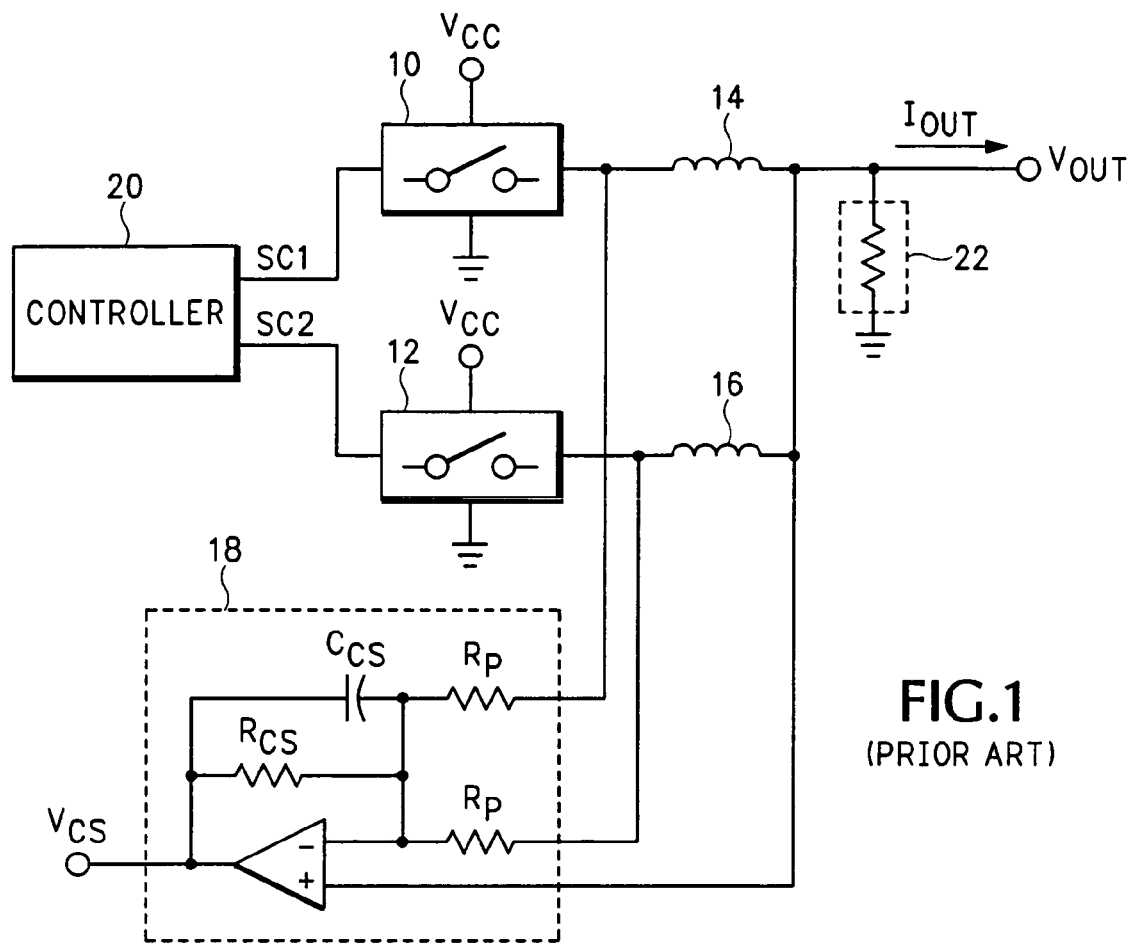
FIG. 1 illustrates a prior art multi-phase switching power supply.
Figure 5:
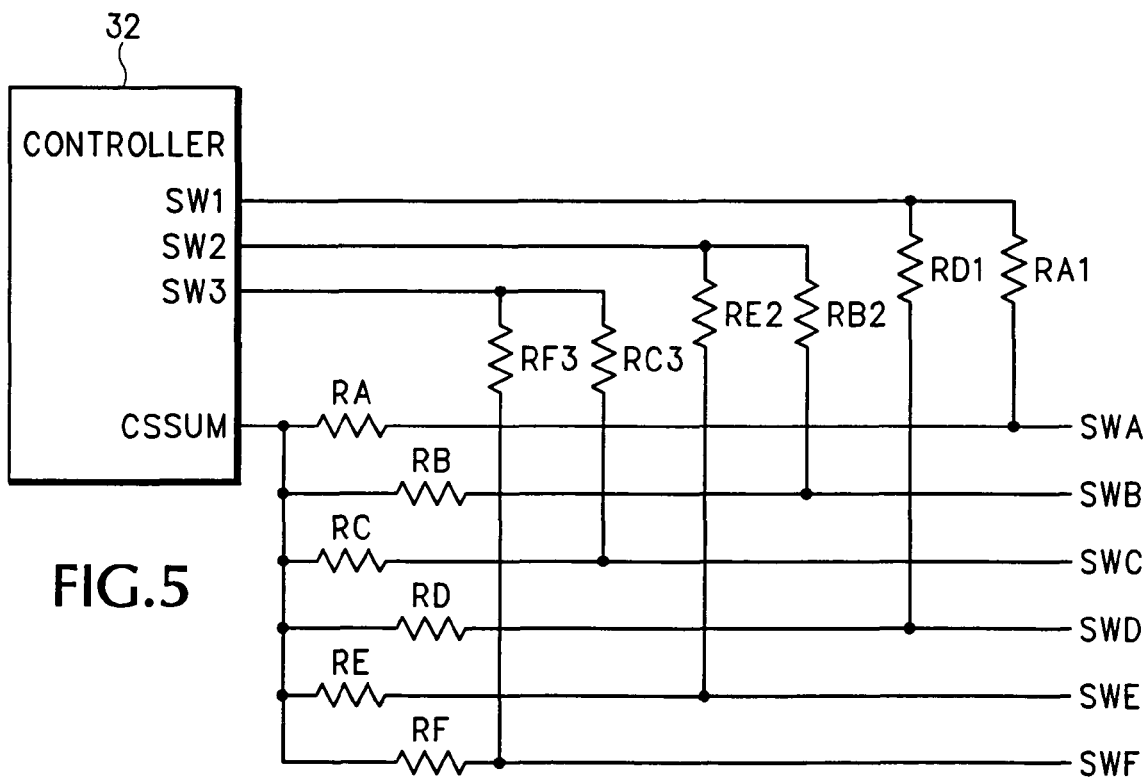
FIG. 5 illustrates an example embodiment of a feedback network according to the inventive principles of this patent disclosure.

FIG. 5 illustrates an example embodiment of a feedback network according to the inventive principles of this patent disclosure. The network of FIG. 5 may be used, for example, in conjunction with the logic of FIG. 4 to provide feedback from double the number of phases normally implemented by an existing switching power supply controller. In the embodiment of FIG. 4, an existing switching power supply controller 32 that implements a three-phase PWM control scheme has three switch node terminals SW1 through SW3 which would typically be connected to switching nodes such as nodes SW1 and SW2 as shown in FIG. 1 for current sensing purposes to provide feedback control and sensing. A current sensing summing node CSSUM combines current sensing signals from multiple phases to measure the total power supply output current. A second series of switching nodes SWA through SWF are connected to the switching nodes of a six-phase power supply that may be controlled by the phase-doubling logic shown in FIG. 4. To provide current sensing feedback for all six phases, pairs of resistors are arranged to form resistive dividers between the original switching nodes SW1-3 and the doubled switching nodes SWA-F. For example, RA1 and RD1 form a divider between SW1, SWA and SWD.

The embodiments of FIGS. 4 and 5 may provide a convenient and economical technique for increasing the number of phases that may be controlled by an existing switching power supply controller. Existing "off-the-shelf" and/or custom controllers are complete designs that have been tested, evaluated and debugged for commercial use. A controller is typically fabricated on an integrated circuit (IC) chip that is usually either mounted in a package on a printed circuit (PC) board or included as part of a multi-chip module. In accordance with the inventive principles of this patent disclosure, logic to generate a greater number of switching control signals (and/or provide feedback from an increased number of phases) may be fabricated separate from the IC on which the controller is formed. Such logic may, for example, be implemented with other commonly available combinational and sequential logic IC chips and components that are mounted in separate packages on the same PC board as the controller. This may enable a switching power supply to be designed with a greater number of phases using very few additional components and without having to redesign the entire controller IC. Thus, the performance of an existing, commercially available switching power supply controller may be substantially improved with only a nominal increase in cost.

Figure 6:
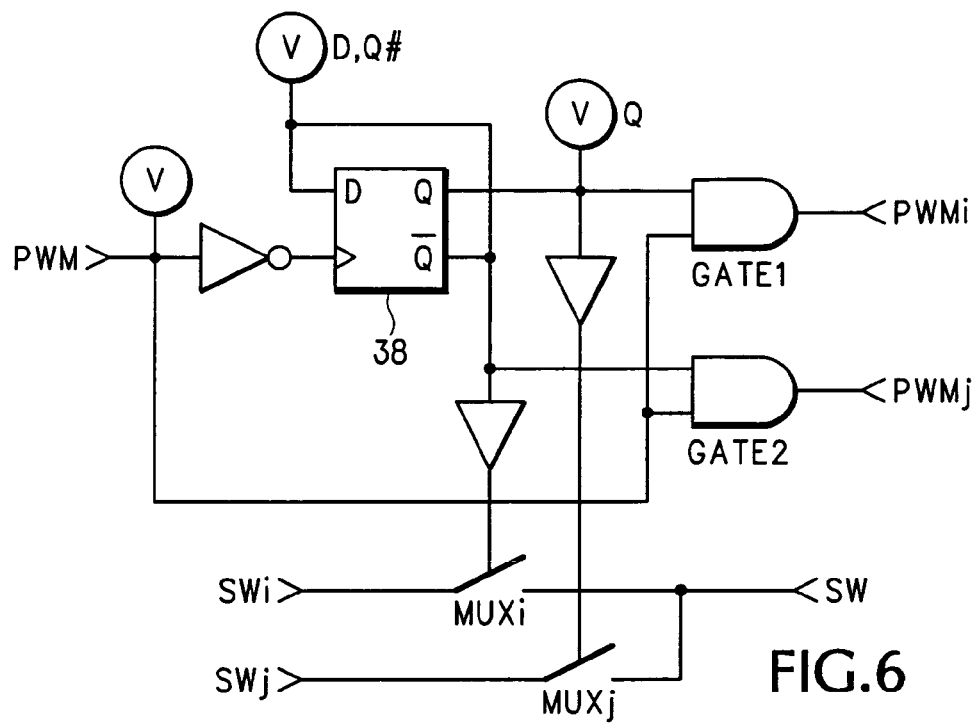
FIG. 6 illustrates a generalized embodiment of a switching power supply control system according to the inventive principles of this patent disclosure.
Figure 7:
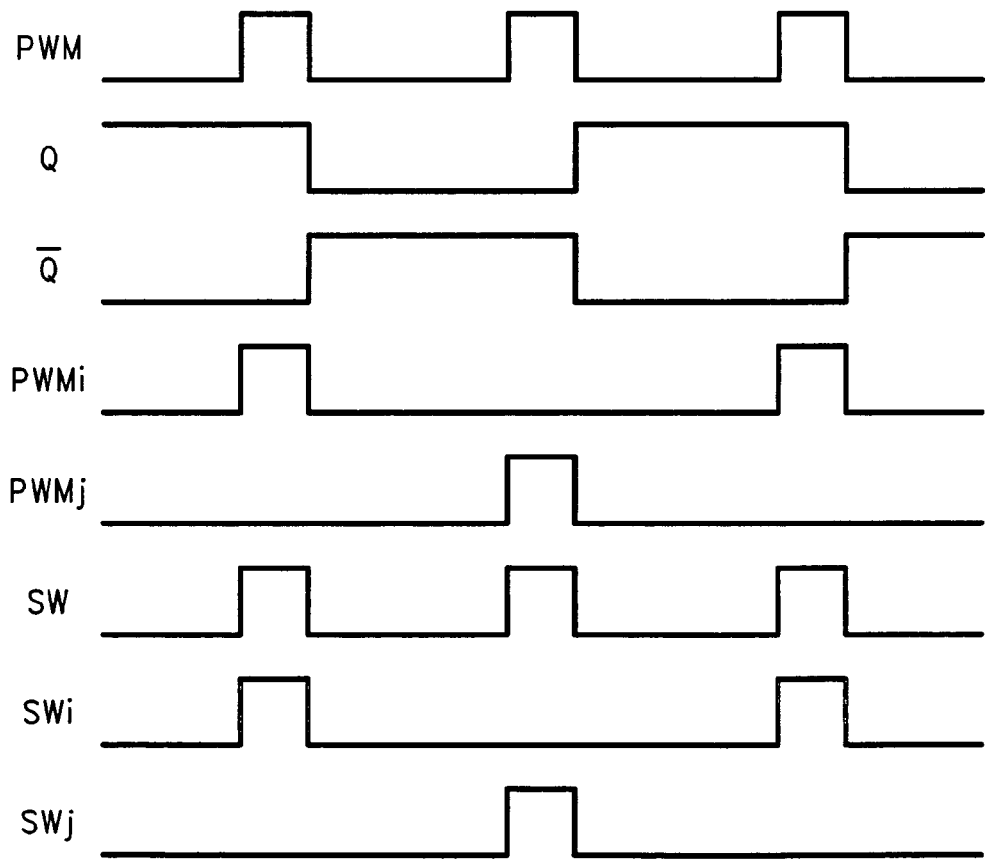
FIG. 7 illustrates example waveforms of signals for the embodiment of FIG. 6.

FIG. 6 illustrates a generalized embodiment of a switching power supply control system according to the inventive principles of this patent disclosure. FIG. 7 illustrates example waveforms of signals for the embodiment of FIG. 6. In this embodiment, a PWM signal is a digital signal from a switch mode power supply (SMPS) PWM controller. The output Q of a D type flip-flop 38 is logic "1" at the beginning of a switching sequence. As the PWM signal from a controller goes low at the end of its first pulse, the falling edge of PWM triggers the D flip-flop causing a logic "0" in the Q output and a "1" in the Q# output. PWMi is the output of the "AND" gate labeled Gate 1 which combines the signals Q and PWM. When Q is low, the second PWM pulse is unable to go through gate 1. PWMi ignores the second PWM pulse. At the same time, PWMj, which is the output of AND Gate 2 (which combines the signals Q# and PWM) receives the second PWM pulse while Q# is "1". As the D flip-flop receives the falling edge of the second PWM pulse, its outputs switch to the opposite states. The third PWM pulse is transferred to PWMi through Gate 1. Therefore, the PWM signal is split alternately to PWMi and PWMj.

A 2-1 multiplexer (MUX) including switches MUXi and MUXj transfers the corresponding switch node signal signals SWi and SWj to SW as the PWM signal toggles between PWMi and PWMj. For example, when the Q output of the D flip-flop is "1", the PWM signal is transferred to PWMi, whereas the SWi signal is switched to SW to provide the right phase switch node signal. The embodiment of FIG. 6 may be extended to implement any number of phases, and the series of first PWM signals may be any number, including one.

Figure 8:
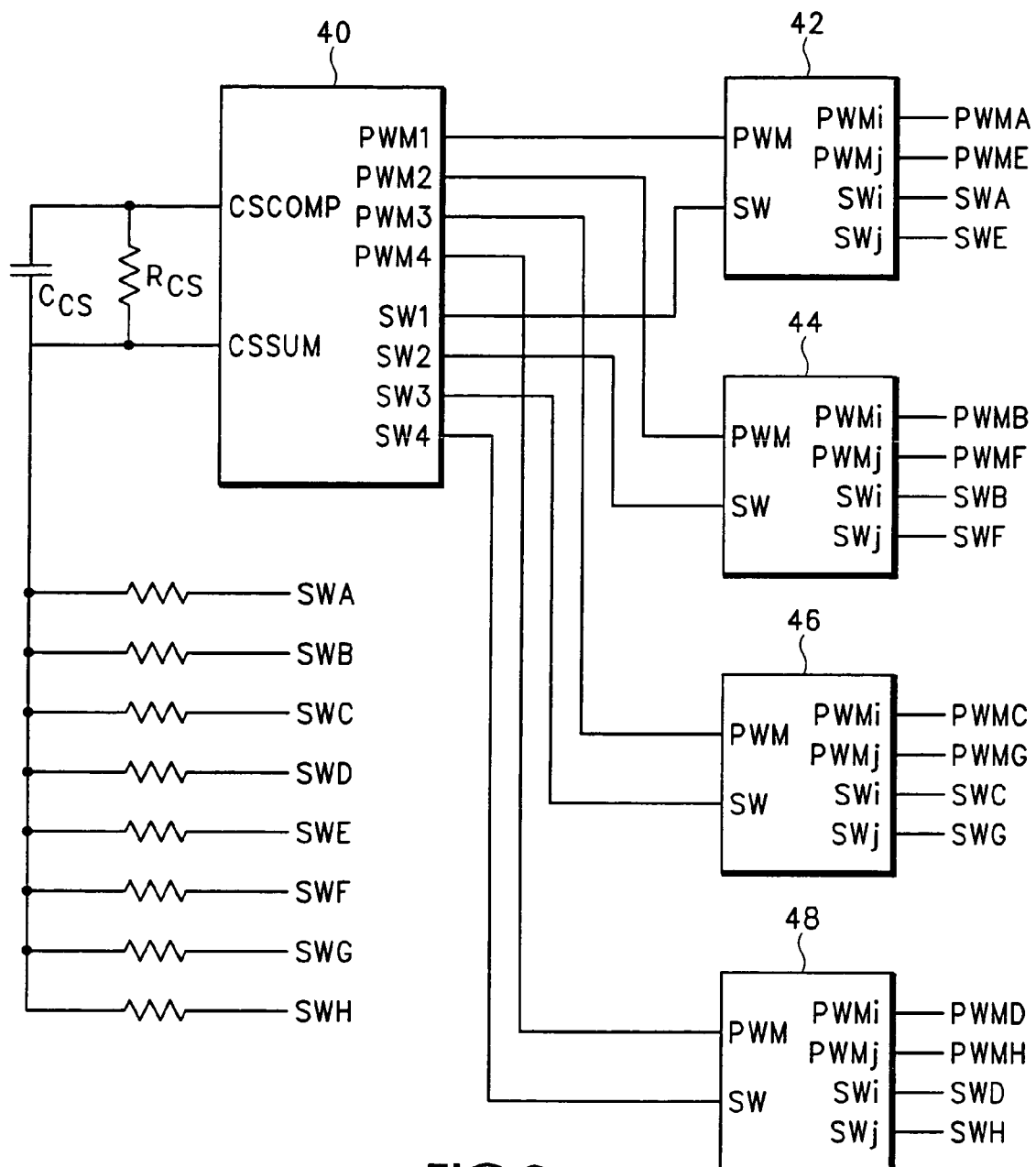
FIG. 8 illustrates another example embodiment according to the inventive principles of this patent disclosure.

FIG. 8 illustrates another example embodiment illustrating how four copies of the single phase doublers shown in FIG. 6 may be arranged to provide four pairs of phases to implement an eight phase PWM controller according to the inventive principles of this patent disclosure. In the embodiment of FIG. 8, a controller 40 has four PWM switching control outputs PWM1-4. Each of these outputs is applied to a corresponding one of four phase doubling blocks 42 through 48 which may be essentially the same as the embodiment of FIG. 6. Each phase doubling block alternately generates two switching control signals (for example, block 42 generates PWMA and PWME in response to PWM1), and alternately applies one of two switching node signals to a corresponding one of the switching node terminals (e.g., SWA and SWE to SW1) of the controller 40.

Figure 9:
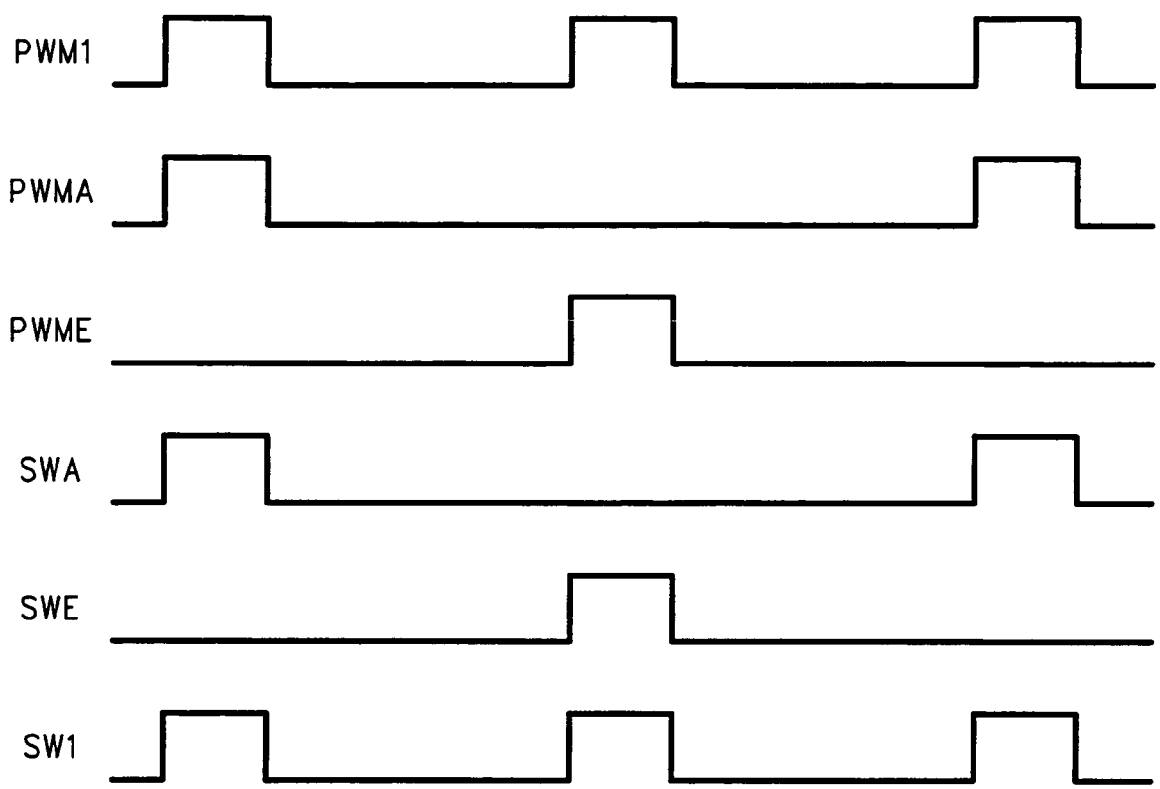

FIG. 9 illustrates example waveforms for a PWM output and SW input for one pair of doubled phases in the embodiment of FIG. 8. FIG. 10 illustrates example waveforms showing how all four of the controller PWM outputs and all eight of the doubled PWM outputs may respond to a sudden load release. The output voltage $V_{OUT}$ shows a slight overshoot as the load is released. This causes PWM4 to skip a pulse which may enable the PWMD and PWMH outputs to shift places relative to the other doubled PWM outputs.

Since the embodiments described above can be modified in arrangement and detail without departing from the inventive concepts, such changes and modifications are considered to fall within the scope of the following claims.

The invention claimed is:

1. A method comprising:
generating a number of first switching control signals with an existing switching power supply controller where the existing power supply controller is fabricated on an integrated circuit and comprises a complete switching power supply controller design that has been tested and debugged for commercial use;
generating a greater number of second switching control signals in response to the first switching control signals using logic that is separate from the integrated circuit; and
summing first feedback signals from a number of phases controlled by the second switching control signals to generate a lesser number of second feedback signals for the existing power supply controller;
wherein each of the greater number of second switching control signals is used to control a power switch in a multi-phase switching power supply.

2. The method of claim 1 where generating the second switching control signals includes demultiplexing the first switching control signals.

3. The method of claim 1 where generating the second switching control signals includes:
- activating the first switching control signals in a sequence to generate a first set of the second switching control signals; and
- activating the first switching control signals in the same sequence to generate a second set of the second switching control signals.

4. A method for increasing the number of phases available from an existing switching power supply controller comprising demultiplexing one or more switching control signals from the controller, wherein each of the signals generated by demultiplexing the one or more switching control signals is used to control a power switch in a multi-phase switching power supply; and
- summing first feedback signals from a number of phases controlled by the demultiplexed signals to generate a lesser number of second feedback signals for the existing switching power supply controller;
- where the controller is fabricated on an integrated circuit mounted in a package on a printed circuit board and comprises a complete switching power supply controller design that has been tested and debugged for commercial use, and the method further includes mounting logic to demultiplex the one or more switching control signals on the printed circuit board, where the logic is separate from the integrated circuit.

5. The method of claim 4 further including combining feedback information from phases controlled by the demultiplexed switching control signals.

6. A switching power supply control system comprising:
- an existing means for generating a first series of switching control signals, where the existing means comprises a complete switching power supply controller design that has been tested and debugged for commercial use;
- means for generating a second series of switching control signals; and
- means for summing a number of first feedback signals from phases controlled by the second series of switching control signals to generate a lesser number of second feedback signals for the existing switching power supply controller;
- where the means for generating a first series of switching control signals is fabricated on an integrated circuit, and the means for generating the second series of switching control signals is separate from the integrated circuit; and
- where each of the second series of control signals is used to control a power switch in a multi-phase switching power supply.

7. The system of claim 6 where the second series has twice the number of switching control signals as the first.

8. The system of claim 6 where the means for generating the second series of switching control signals comprises means for demultiplexing.

* * * * *